T. J. KING.
FARMING IMPLEMENT.
APPLICATION FILED JUNE 3, 1908.
932,785.
Patented Aug. 31, 1909.
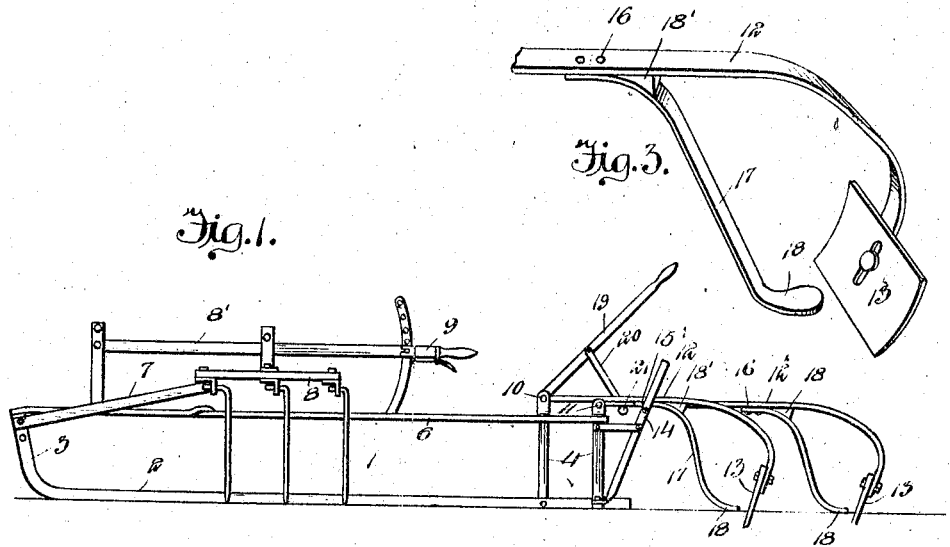
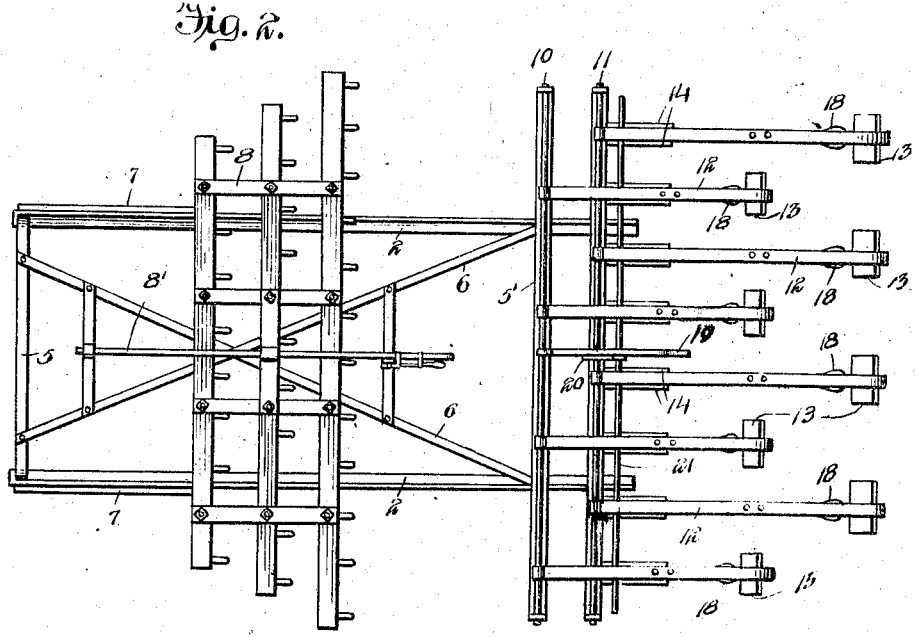
Witnesses
G. M. Spring.
K. Home.
Inventor
Thomas Joel King,
By David P. Moore,
his Attorney

UNITED STATES PATENT OFFICE.

THOMAS J. KING, OF RICHMOND, VIRGINIA.

FARMING IMPLEMENT.

932,785.     Specification of Letters Patent.    Patented Aug. 31, 1909.

Application filed June 3, 1908. Serial No. 436,402.

*To all whom it may concern:*

Be it known that I, THOMAS J. KING, a citizen of the United States, residing at Richmond, in the county of Henrico and State of Virginia, have invented certain new and useful Improvements in Farming Implements, of which the following is a specification, reference being had therein to the accompanying drawing.

This invention relates to improvements in weeders and choppers, the main object of my invention being the provision of a machine of this character, which is especially adapted for use in the cultivation of cotton, corn, peanuts and potatoes.

This invention consists primarily of a combination weeding and chopping mechanism, in which I employ a runner or suitable carrying frame, a weeder frame being mounted forwardly in said carrying frame, and having operating means whereby the same may be thrown into or out of use and be adjusted to operate at various depths. This much of my invention has been formally protected by Letters Patent, but to make this more efficient, I attach a series of hoes to swing in the rear of the weeder frame, and automatically cut or chop any given depth, and combination of the two crossing at right angles and when operating, cutting or chopping out the cotton to a stand.

To more clearly bring out the main features of my invention, attention is invited to the accompanying drawings, in which:—

Figure 1 is a side elevation of the complete machine. Fig. 2 is a top plan view thereof, and Fig. 3 is a detail view of the chopper arm and spring actuator.

Referring to the drawings:—the numeral 1 designates the carrying frame, which in this instance is a pair of runners 2, provided with upwardly curved forward ends 3, and the vertical rear uprights 4. Connecting each pair are the front and rear transverse bars 5 and 5', respectively, while attached to the bars, are the two bars 6, which are crossed longitudinally in X form, and by means of which the frame is made rigid. Mounted upon the two pivoted arms 7, in the forward portion of the frame, is the weeder frame 8, which is of usual construction, and is raised and lowered through the medium of the lever 8', and its operating handle 9, as clearly shown.

weeder frame and upon the rear portion of the bars 6 and the upper ends of the uprights 4, are the two transverse bars 10 and 11, to each one of which is hingedly secured its series of helves or arms 12, in whose lower ends are mounted the detachable and adjustable hoes or choppers 13. These hoes or choppers are so arranged as to leave a "block" of about three or four inches, that they do not chop, and they are set to run each behind or in front of the other. The blades or hoes are detachable and in such a manner that they may be moved to the proper adjustment. They are preferably only a few inches high and slightly rearwardly inclined in order that loosened dirt, stalks, grass and the like will pass easily over the top. The width may be from eight to twenty inches depending upon the distance apart, it is desired to leave the cotton stalks. In order to limit the downward action of the hoes or choppers, I provide each helve or arm 12 with a pair of guide arms 14, whose removable pin 15 limits the downward movement, while the guide itself prevents any lateral or transverse movement.

To render the action of the hoes or choppers automatic, I secure to the underside of each helve or arm at 16, the inner end of the spring arm or shoe 17, whose foot or oval-shaped lower end 18, is adapted to contact the ground in advance of its respective hoe or chopper and have its lower face normally slightly above the lower edge of the hoe or chopper. By this means as the machine is drawn over the ground, the surface of the ground causes the spring arm or shoe in tracing its contour, to cause the hoe or chopper to have a sudden "hoeing" or chopping action. To adjust the tension of the actuator, I provide the wedge block 18', which is adapted to be moved to or from the junction of the actuator and helve, the farther it is inserted, the greater the tension, as will be clearly seen.

When it is desired to raise the hoes or choppers, the operating lever 19, is raised, it in turn through the short link 20, and the transverse bar 21, which rests below and in contact with all of the helves or arms 12, lifts said bar 21 and simultaneously all of the helves or arms 12 and their actuators and hoes or choppers.

From the foregoing description it is evichopper, which may be mounted either upon a wheeled and sledge carrying frame, and which is provided with a weeder frame and with a hoeing or chopping mechanism, although I would have it understood that my chopping mechanism may be mounted in a frame separate from the weeder frame without departing from the spirit of my invention.

What I claim, as new, is:—

1. In a farming implement, the combination with a carrying frame, of a chopper mechanism mounted therein and comprising a series of transverse bars capable of oscillatory movements, a series of arms carried by each bar, a chopper blade carried upon the free end of each arm, a spring shoe connected to each arm intermediate of the arms' ends, said shoe having its free end engaging the ground in advance of the blade, and means for operating the bars to cause the blades and shoes to engage or disengage the ground.

2. In a farming implement, the combination with a carrying frame, of a chopper mechanism mounted therein and comprising a series of transverse bars capable of oscillatory movements, a series of arms carried by each bar, a chopper blade carried upon the free end of each arm, a spring shoe connected to each arm intermediate of the arms' ends, said shoe having its free end engaging the ground in advance of the blade, means for regulating the throw of the spring shoe interposed between it and the arm, and means for operating the bars to cause the blades and shoes to engage or disengage the ground.

3. In a chopper blade support, the combination of an arm adapted to have one end supported and the other free, a chopper blade adjustably connected to the free end, a spring shoe having a foot adapted to contact the ground in advance of the blade, the other end being connected to the arm intermediate of the ends of the arm, and a wedge adapted to be inserted at the junction between the arm and shoe, whereby the chopping action of the blade is increased or decreased, as set forth.

4. In a farming implement, the combination with a carrying frame, of a chopper mounted therein and comprising a series of transverse bars capable of oscillating movements, a series of arms carried by each bar, a chopper blade carried upon the free end of each arm, a spring shoe connected to each arm intermediate of each arm's ends, said shoe having its free end engaging the ground in advance of the blade, means for operating the bars to cause the blades and shoes to engage or disengage the ground, and means for guiding the arms in their vertical movement.

5. In a farming implement, the combination with a carrying frame, of a chopper mounted therein and comprising a series of transverse bars capable of oscillating movements, a series of arms carried by each bar, a chopper blade carried upon the free end of each arm, a spring shoe connected to each arm intermediate of each arm's ends, said shoe having its free end engaging the ground in advance of the blade, means for operating the bars to cause the blades and shoes to engage or disengage the ground, means for guiding the arms in their vertical movement, and means for limiting such vertical movement of the arms.

6. In a chopper blade support, the combination of an arm adapted to have one end supported and the other free, a chopper blade carried by the free end, and a spring shoe having one end removably connected to the arm intermediate of the ends of the arm and above the blade and having its foot, which is the free end in advance of the blade, whereby the foot will engage the ground in advance of the blade.

In testimony whereof I affix my signature in presence of two witnesses.

THOMAS J. KING.

Witnesses:
E. I. TRICE,
C. W. WINN.